United States Patent [19]
Dawans et al.

[11] 3,919,133
[45] Nov. 11, 1975

[54] VULCANIZABLE COMPOSITIONS AND THE VULCANIZED COMPOSITIONS OBTAINED THEREFROM

[75] Inventors: François Dawans, Bougival; Jean-Pierre Durand, Chatou, both of France

[73] Assignee: Institut Francais du Petrole, Rueil-Malmaison, France

[22] Filed: Mar. 27, 1974

[21] Appl. No.: 455,077

[30] Foreign Application Priority Data
Apr. 5, 1973 France................. 73.12388

[52] U.S. Cl. ........ 260/5; 260/33.6 AQ; 260/79.5 P; 260/94.3; 260/894
[51] Int. Cl.² .... C08L 7/00; C08L 9/00; C08K 5/01
[58] Field of Search.......... 260/94.3, 33.6 AQ, 879, 260/5, 894, 79.5 P

[56] References Cited
UNITED STATES PATENTS

| | | | |
|---|---|---|---|
| 3,428,699 | 2/1969 | Schleimer | 260/94.3 |
| 3,468,866 | 9/1969 | Alferov et al. | 260/94.3 |
| 3,497,488 | 2/1970 | Dawans et al. | 260/94.3 |

*Primary Examiner*—Donald E. Czaja
*Assistant Examiner*—H. H. Fletcher
*Attorney, Agent, or Firm*—Millen, Raptes & White

[57] ABSTRACT

Vulcanizable compositions of increased resistance to tearing, which comprise (a) vulcanizable elastomer, (b) vulcanization ingredients and (c) a processing cross-linkable oil consisting at least partly of liquid polybutadiene of molecular weight lower than 20,000, whose microstructure comprises 40–60 % of 1,4-cis units, 40–60 % of 1,4-trans units and less than 5 % of 1,2-units, having a glass transition temperature lower than -90°C, said polybutadiene being obtained by polymerizing 1,3-butadiene in the presence of a $\pi$-allyl nickel fluorocarboxylate in an aromatic hydrocarbon solvent.

17 Claims, No Drawings

VULCANIZABLE COMPOSITIONS AND THE VULCANIZED COMPOSITIONS OBTAINED THEREFROM

This invention concerns new vulcanizable compositions and the vulcanized compositions obtained therefrom.

It is known that the resistance to tearing of the synthetic rubbers containing (co-) polymers of dienes and particularly polybutadienes is lower than that of natural rubber. This defect has up to now limited their use, in spite of the fact that they are less expensive, as substitutes for natural rubber, particularly for manufacturing certain tires. This defect may be partially obviated by using synthetic diene-containing elastomers in admixture with natural rubber; however the resulting rubber does not have all the performance characteristics of the natural rubber, as used alone.

An object of this invention is to provide new vulcanized compositions, containing synthetic diene (co-) polymers which have a substantially improved resistance to tearing, in some cases, close to that of natural rubber, as used alone, while retaining the other mechanical properties practically unchanged.

Another object of the invention is to provide new vulcanizable compositions containing synthetic diene (co-) polymers, which, under conventional vulcanization conditions, form these new and improved vulcanized compositions, said vulcanizable compositions being workable just as the crude elastomers containing synthetic or natural diene polymers, as used in the prior technique.

Other objects of the invention will appear from the following description to those skilled in the art.

The vulcanizable compositions of the invention may be essentially defined as comprising (a) elastomer to be vulcanized, comprising at least partly of one or more synthetic diene (co-) polymers or homo polymers and (b) conventional formulation additives, amongst which the usually employed hydrocarbon oil is replaced at least partly with a cross-linkable oil consisting of a polybutadiene which is liquid at room temperature and is obtained by polymerizing 1, 3-butadiene in the presence of at least one aromatic hydrocarbon and a catalyst consisting of a π-allyl nickel fluorocarboxylate of the general formula:

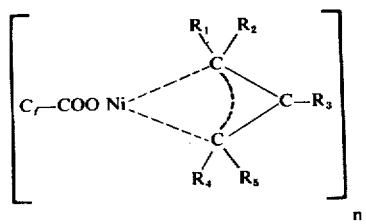

in which $C_f$ is an alkyl group, whose carbon atom vicinal to the carboxylate group is substituted with at least one fluorine atom. For example, the $C_f$ group may be $CH_2F-$, $CHF_2-$, $CF_3-$, $CCl_2F-$, $CH_3-CHF-$, $CH_3-CF_2-$ and $CF_3-CF_2-CF_2-$.

$R_1$, $R_2$, $R_3$, $R_4$ and $R_5$, which may be similar or different, are each a hydrogen atom or an alkyl, cycloalkyl or aryl hydrocarbon radical preferably containing 1-20 carbon atoms, and n is an integer, usually 1 or 2.

The liquid polybutadiene used according to the invention has the following characteristics:

a microstructure consisting essentially of substantially equivalent proportions of 1,4-cis and 1,4-trans units, i.e. 40–60% of 1,4-cis units, 40–60% of 1,4-trans units and less than 5% of 1,2-units, more particularly 45–55% of 1,4-cis units, 45–55% of 1,4-trans units and less than 3% of 1,2units;

a glass transition temperature lower than $-90°C$, preferably from $-100°$ to $-110°C$;

and a number average molecular weight lower than 20,000, preferably from 1,000 to 5,000.

A method for producing this polybutadiene is described in the French Patents 1,478,338 and 1,590,083. According to an advantageous embodiment, 1,3-butadiene may be polymerized in a benzenic medium, in the presence of a π-allyl nickel trifluoroacetate as catalyst.

Liquid polybutadienes consisting chiefly of 1,4-cis and/or 1,4-trans units have been used in the prior art as constituents (plasticizers) of vulcanizable compositions containing synthetic rubbers. They were prepared according to methods of polymerization of 1,3-butadiene by means of alkali metal derivatives, such as butyl lithium, or organometallic systems of the Ziegler type.

Among these liquid polybutadienes, some may have a microstructure similar to that of the liquid polybutadienes of the present invention, although it has surprisingly been found that, for obtaining vulcanized compositions having an improved resistance to tearing, it is essential for the liquid polybutadiene not only to have substantially equal contents of 1,4-cis and 1,4-trans units (40 –60% of units of each structure) and a low content of 1,2-units (less than 5%), but also to be prepared according to the hereinbefore indicated particular method.

In the vulcanizable compositions of the invention, the elastomer to be vulcanized may consist essentially of one synthetic (co-) polymer of high molecular weight containing at least one conjugated diene, for example from $C_4$ to $C_8$, such as a mainly 1,4 - cis polybutadiene or polyisoprene, a polybutadiene or polyisoprene having a variable content of 1,4 - trans isomer, a preferentially 1,2 polybutadiene, a copolymer of butadiene with styrene and/or acrylonitrile, a polypentadiene or polydimethylbutadiene, or a mixture of several of these synthetic polymers. The vulcanizable compositions of the invention also concern the synthetic polymers of polydienic structure, as obtained by polymerization of other monomers as conjugated dienes; this concerns, for example, polymers obtained by polymerization and ring-opening of $C_5-C_{10}$ cyclic olefins, for example cyclopentene, $C_5-C_{12}$ cyclic diolefins, for example 1,5 - cyclooctadiene or 1, 5, 9 - cyclododecatriene.

The elastomer to be vulcanized may also contain natural rubber, and although the advantage of the invention is essentially to improve the resistance to tearing of vulcanized compositions containing synthetic polymers, the invention also concerns the vulcanizable compositions whose elastomer to be vulcanized contains, for example, up to 80% b. w. of natural rubber, for example a mixture of natural rubber with at least one homopolymer or copolymer of 1,3 - butadiene.

When the elastomer to be vulcanized is a mixture of several synthetic elastomers or a mixture of at least one synthetic elastomer with natural rubber, the mixture may be processed according to any conventional technique for mixing elastomers, for example in a roll-mixer at a convenient temperature, for example 30°–80°C. If desired, the liquid polybutadiene of the invention and conventional vulcanization additives may be incorporated in the vulcanizable elastomer during this mixing step, as explained hereinafter.

For obtaining to a large extent the improvement of the invention, a substantial proportion of - and preferably the whole conventionally used aromatic hydrocarbon oil is replaced by an equivalent amount of the liquid polybutadiene as hereinbefore defined. The effect of this substitution becomes significant from replacement ratios of about 25% by weight.

As a rule, the liquid polybutadiene of the invention may be used in a proportion of 3–20 parts by weight per 100 parts by weight of vulcanizable elastomer.

The other formulation additives contained in the vulcanizable compositions of the invention are conventional additives, i.e. vulcanization agents (essentially sulfur, zinc oxide and vulcanization accelerators), stearic acid, a filler (essentially carbon black) and anti-oxidant agents such as N-phenyl-$\beta$-naphthyl amine.

All these additives are incorporated in the vulcanizable elastomer in usual proportions although we recommend to use sulfur and the accelerator in a ratio by weight of 1.5 to 3, preferably about 2.2.

The vulcanizable compositions of the invention may be prepared according to any conventional calendering technique, for example in a roll-mixer at a convenient temperature, for example 30° – 80°C.

The vulcanization of these calendered compositions results in the improved vulcanized compositions of the invention; the vulcanization is carried out in a press under usual conditions of temperature and pressure: for example, the temperature is about 130° – 180°C, preferably about 150°C, and the pressure about 1 – 100 bars, preferably about 70 bars. It may be noted that the optimal covulcanization of the compositions according to the invention is somewhat delayed, so that the necessary vulcanization times will be somewhat longer than those conventionally used according to the prior technique. For example, at 150°C, the vulcanization period is at least 15 minutes and preferably 20 – 30 minutes.

In order to show the unobviousness of the effect produced by the specific use of liquid polybutadiene, as defined in the description of the invention, and the criticality of the characteristics which limit its definition, it is to be noted that the use of liquid polybutadienes of analogous molecular weight and similar or different microstructure, as prepared according to other methods, does not result in vulcanized compositions having all the properties of the vulcanized compositions of the invention. For example, a possible improvement in the resistance to tearing which, in the best case, does not reach that obtained according to the present invention, is always accompanied with a loss of other performance characteristics obtained by the compositions containing a conventional hydrocarbon oil.

The vulcanized compositions of the invention may be usefully employed for the same purposes as the natural or synthetic rubbers, for example for manufacturing tires or transmission belts.

The examples 2, 9 and 12 illustrate the invention; they are not to be considered as limiting its scope to the described embodiments. The other examples are given for comparison. In these examples, the values of the resistance to tearing have been determined according to the standard ASTM D 746.

EXAMPLE 1 (for comparison)

Calendering at 60°C on a roll-mixer has been used to prepare a vulcanizable composition by adding to 1,4 - cis polybutadiene (commercially available as Cariflex BR 1220) the components stated in the following Table I.

Vulcanizates have been obtained by subjecting the calendered mixture to a temperature of 150°C and a pressure of 70 bars for 30 minutes.

Five samples have been used for determining the main properties of the vulcanizate according to the ASTM standards. The results (average of 5 samples) are given in Table I.

EXAMPLE 2

The vulcanizable composition of example 1 has been modified by replacing the 15 parts by weight of aromatic oil with an equivalent amount of polybutadiene obtained by polymerizing for 3 hours at 30°C a solution of 52 g of 1,3 - butadiene in 200 g of benzene in the presence of 0.85 g of $\pi$-allyl nickel trifluoracetate (CF$_3$ COO Ni $\pi$–C$_3$ H$_5$).

The characteristics of the polymer are the following: microstructure:

| 1,4 - cis units | 1,4 - trans units | 1,2 - units |
|---|---|---|
| 47 % | 51 % | 2 % | number average molecular weight: 2,600

This mixture has been subjected to vulcanization under the conditions stated in example 1. The properties of the resulting vulcanizate are given in Table I (average value for 5 samples). It may be noted that the resistance to tearing is substantially improved, as compared with the vulcanizate of example 1.

TABLE I

|  |  | Example 1 | Example 2 |
|---|---|---|---|
|  | 1,4-cis Polybutadiene | 100 | 100 |
|  | Aromatic oil ("SUNDEX") | 15 | — |
|  | Liquid 1,4 cis/trans Polybutadiene | — | 15 |
|  | Phenyl-$\beta$-naphthylamine | 1 | 1 |
|  | ISAF Black | 45 | 45 |
| Formulation (in parts b.w.) | Product of condensation of diphenylamine with acetone ("PERMANAX"47") | 1 | 1 |
|  | Stearic acid | 1.5 | 1.5 |
|  | Sulfur | 2 | 2 |
|  | Zinc oxide | 5 | 5 |
|  | N cyclohexyl 2 benzothiazyl sulfenamide ("RHODIFAX 16") | 0.91 | 0.91 |
| Proper- | Modulus at 100 % (da N/cm$^2$) | 27 | 26 |
| ties ac- | Modulus at 300 % (da N/cm$^2$) | 111 | 108 |

TABLE I-continued

|  |  | Example 1 | Example 2 |
|---|---|---|---|
| cording to ASTM standard (average of 5 samples) | Resistance to breaking (da N/cm$^2$) | 163 | 165 |
| | % lengthening at break | 425 | 420 |
| | Resistance to tearing (da N/cm) | 42 | 70 |

EXAMPLES 3 and 4 (for comparison)

Example 2 has been repeated, except that the 15 parts by weight of liquid 1,4-cis/trans polybutadiene have been replaced with the same weight of polybutadiene of analogous molecular weight and different microstructure:

a polybutadiene containing 30% of 1,4 - cis units and 70% of 1,2 - units, prepared with a catalyst containing π-allyl molybdenum trifluoracetate (example 3), and a polybutadiene containing 90% of 1,4 - cis units, 5% of 1,4 - trans units and 5% of 1,2 - units, prepared in the presence of nickel chloride trifluoracetate (example 4).

Under the same conditions as in example 2, vulcanizates are obtained, which do not have all the properties of the vulcanizate obtained according to said example 2: for example, the values of the resistance to tearing do not differ substantially from that observed with the vulcanizate of example 1.

EXAMPLES 5, 6 and 7 (for comparison)

Example 2 has been repeated, except that liquid polybutadiene obtained in the presence of the catalyst CF$_3$ COO Ni π-C$_3$H$_5$ has been replaced with polybutadiene of similar molecular weight and content of 1,4 - cis and 1,4 - trans isomers, although prepared according to various modes of synthesis:

in the presence of triethyl aluminum and titanium tetrachloride (molar ratio Ti/Al = 0.75) (example 5)

in the presence of triisobutyl aluminum, nickel acetate and antimony pentachloride (molar ratio 1/0.05/1.5) (example 6)

in the presence of n-butyl lithium (example 7).

The values of the resistance to tearing of the vulcanized compositions are respectively 44, 47 and 41 da N/cm.

EXAMPLES 8 (for comparison) and 9

Examples 1 and 2 have been repeated but with a vulcanization time limited to 15 minutes, the remaining conditions being unchanged. The values of the resistance to tearing were respectively 50 da N/cm (example 9 with liquid polybutadiene) and 44 da N/cm (example 8 with the aromatic oil SUNDEX).

EXAMPLES 10, 11 (comparative) and 12

The three vulcanizable compositions whose formulation is given in Table II have been prepared by calendering under the conditions of example 1. 1,4-cis polybutadiene, used in the examples 11 and 12, is a polymer known under the trade mark Cariflex BR 1220, while the liquid polybutadiene used in example 12 and which conforms to the invention has the following properties: microstructure:

| 1,4 - cis units | 1,4 - trans units | 1,2 - units |
|---|---|---|
| 49 % | 50 % | 1 % | number average molecular weight: 4,600

It has been obtained by heating at 50°C a solution of 100 g of 1,3 - butadiene in 350 g of toluene, in the presence of 1.23 g of π- crotyl nickel perfluoropropionate (CF$_3$ CF$_2$ CO$_2$ Ni π-C$_4$H$_7$)

TABLE II

| | | Example 10 | Example 11 | Example 12 |
|---|---|---|---|---|
| Formulation (in parts b.w.) | Natural rubber | 100 | 60 | 60 |
| | 1,4-cis Polybutadiene | — | 40 | 40 |
| | Aromatic oil ("SUNDEX") | 3 | 15 | — |
| | Liquid 1,4 cis/trans Polybutadiene | — | — | 15 |
| | Phenyl-β-naphthylamine | 1 | 1 | 1 |
| | ISAF Black | 45 | 45 | 45 |
| | Product of condensation of diphenylamine with acetone ("PERMANAX 47") | 1 | 1 | 1 |
| | Stearic acid | 3 | 2.4 | 2.4 |
| | Sulfur | 2.5 | 2.3 | 2.3 |
| | Zinc oxide | 5 | 5 | 5 |
| | N cyclohexyl 2 benzo thiazyl sulfenamide ("RHODI-FAX 16") | 0.6 | 0.76 | 0.76 |
| Resistance to tearing (da N/cm) | | 90 | 64 | 90 |

These calendered compositions have been vulcanized under the conditions of example 1. From the values of the resistance to tearing of the 3 resulting vulcanizates (average result over 5 samples in each case), it appears that the replacement of the aromatic oil with liquid 1,4 - cis/trans polybutadiene confers to a 60/40 mixture of natural rubber and 1,4 - cis polybutadiene a value of the resistance to tearing similar to that of the vulcanized natural rubber.

What we claim is:

1. A vulcanizable composition which consists essentially of a mixture of (a) vulcanizable elastomer of up to 80% by weight natural rubber, and one or more synthetic polymers having unsaturated hydrocarbon structure, (b) vulcanization ingredients and (c) hydrocarbon oil containing 25-100% by weight of polybutadiene liquid at room temperature having a microstructure comprising 40 - 60% of 1,4 - cis units, 40 - 60% of 1,4 - trans units and less than 5% of 1,2 - units, a glass transition temperature lower than − 90° C, a number average molecular weight lower than 20,000 and prepared by polymerizing 1,3 - butadiene in the presence of at least one $\pi$ - allyl nickel fluorocarboxylate in an aromatic hydrocarbon, the amount of the polybutadiene liquid being about 3–20 parts by weight per 100 parts by weight of vulcanizable elastomer.

2. A composition according to claim 1, wherein the vulcanizable elastomer consists essentially of at least one synthetic unsaturated polymer of high molecular weight selected from those obtained by homopolymerizing or copolymerizing at least one $C_4$–$C_8$ conjugated diolefin, one $C_5$–$C_{10}$ cyclic olefin, one $C_5$–$C_{12}$ cyclic diolefin and/or 1,5,9 - cyclododecatriene.

3. A composition according to claim 2, wherein the vulcanizable elastomer consists essentially of at least one synthetic unsaturated polymer selected from the polybutadienes, polypentenamers and copolymers of butadiene with styrene and/or acrylonitrile.

4. A composition according to claim 1, wherein the vulcanizable elastomer consists essentially of a mixture of natural rubber with at least one homopolymer or copolymer of 1,3 - butadiene.

5. A composition according to claim 1, wherein the liquid polybutadiene is obtained by polymerizing 1,3 - butadiene in the presence of $\pi$-allyl nickel trifluoroacetate in benzene.

6. A composition according to claim 1, wherein the liquid polybutadiene is obtained by polymerizing 1,3 - butadiene in the presence of $\pi$- crotyl nickel perfluoropropionate in toluene.

7. A composition according to claim 1, wherein the liquid polybutadiene has a number average molecular weight of from 1,000 to 5,000, a microstructure of 45 - 55% of 1,4 - cis units, 45 - 55% of 1,4 - trans units and less than 3% of 1,2-units, and a glass transition temperature lower than −90°C.

8. A composition according to claim 1, wherein the hydrocarbon oil comprises 100% b.w. of the liquid polybutadiene.

9. A composition according to claim 1, wherein the liquid polybutadiene amounts to 3 – 20 parts by weight per 100 parts by weight of vulcanizable elastomer.

10. A composition according to claim 1, wherein sulfur and a vulcanization accelerator in a ratio of 1.5 – 3 b.w. are present among the vulcanization ingredients.

11. A process for manufacturing, from an elastomer of up to 80% natural rubber, and synthetic polymer, a vulcanized composition having an improved resistance to tearing, said process comprising subjecting a calendered vulcanizable composition according to claim 1 to a temperature of 130° – 180° C and a pressure of 1 – 100 bars.

12. A process according to claim 11, wherein said calendered vulcanizable composition is subjected to a temperature of about 150°C and a pressure of about 70 bars for at least 15 minutes.

13. A process according to claim 12, wherein the vulcanization time is 20 – 30 minutes.

14. A vulcanized composition of improved resistance to tearing, as obtained by vulcanizing the vulcanizable composition of claim 1.

15. A vulcanized composition vulcanized according to the process of claim 11.

16. A composition according to claim 5 wherein said elastomer is 1,4-cis polybutadiene, and said hydrocarbon oil is said liquid polybutadiene, the weight ratio of the elastomer to the hydrocarbon oil being 100 to 15 respectively.

17. A composition according to claim 6, wherein said elastomer is 60% by weight natural rubber and 40% by weight 1,4-cis-polybutadiene, said hydrocarbon oil is said liquid polybutadiene, the weight ratio of the elastomer to the hydrocarbon oil being 100 to 15 respectively.

\* \* \* \* \*